United States Patent [19]
Collin et al.

[11] Patent Number: 5,907,924
[45] Date of Patent: Jun. 1, 1999

[54] METHOD AND DEVICE FOR TREATING NATURAL GAS CONTAINING WATER AND CONDENSIBLE HYDROCARBONS

[75] Inventors: Jean-Claude Collin, Marsinval-Verneuil; Joseph Larue, Chambourcy; Alexandre Rojey, Rueil Malmaison, all of France

[73] Assignee: Institut Francais du Petrole, Rueil-Malmaison, France

[21] Appl. No.: 08/849,665

[22] PCT Filed: Oct. 10, 1996

[86] PCT No.: PCT/FR96/01581

§ 371 Date: Aug. 29, 1997

§ 102(e) Date: Aug. 29, 1997

[87] PCT Pub. No.: WO97/13574

PCT Pub. Date: Apr. 17, 1997

[30] Foreign Application Priority Data

Oct. 11, 1995 [FR] France ................................ 95/12004

[51] Int. Cl.$^6$ ........................... B01D 47/05; B01D 47/06
[52] U.S. Cl. ........................... 45/194; 55/315.2; 95/228; 95/231; 95/237; 96/242; 96/266; 96/277; 96/295
[58] Field of Search ............................ 95/194, 204, 288, 95/231, 236, 237, 238, 239, 240, 228; 55/315.1, 315.2, 338.1; 96/242, 239, 266, 272, 273, 277, 290, 295, 322, 327

[56] References Cited

U.S. PATENT DOCUMENTS

| | | | |
|---|---|---|---|
| 3,253,390 | 5/1966 | Connors | 95/231 |
| 3,589,104 | 6/1971 | Panzarella | 95/231 |
| 3,633,338 | 1/1972 | Zahn | 96/242 |
| 4,460,385 | 7/1984 | Pan et al. | 95/236 |
| 4,575,387 | 3/1986 | Larue et al. | 95/188 |
| 4,606,741 | 8/1986 | Moreau et al. | 95/231 |
| 4,634,455 | 1/1987 | Barta et al. | 95/231 |
| 4,979,966 | 12/1990 | Rojey et al. | 95/236 |
| 5,261,936 | 11/1993 | Someus | 96/273 |
| 5,462,582 | 10/1995 | Holm | 95/194 |
| 5,735,936 | 4/1998 | Minkkinen et al. | 96/242 |

FOREIGN PATENT DOCUMENTS

| | | | |
|---|---|---|---|
| 0218125 | 9/1986 | European Pat. Off. . | |
| 0362023 | 4/1990 | European Pat. Off. . | |
| 1794353 | 2/1973 | Germany | 95/231 |
| 2026534 | 2/1980 | United Kingdom | 95/228 |
| 2139111 | 11/1984 | United Kingdom . | |

*Primary Examiner*—Duane S. Smith
*Attorney, Agent, or Firm*—Antonelli, Terry, Stout & Kraus, LLP

[57] ABSTRACT

A method of treating gas containing water in order to remove at least part of the water from the gas, including feeding the natural gas to be treated by a first line, with a liquid fraction containing at least an aqueous phase is fed via a second line in the presence of a solvent into a contact zone, so as to bring the gas into direct contact with the liquid fraction over at least a portion of the contact zone. The solvent is a non-hydrocarbon compound other than water, and simultaneously, the gas is cooled in the presence of the solvent in order to condense at least one liquid phase consisting essentially of water in a mixture with the solvent. The non-condensed gaseous phase is separated from the condensed liquid phase, from which the solvent has essentially been removed

20 Claims, 6 Drawing Sheets

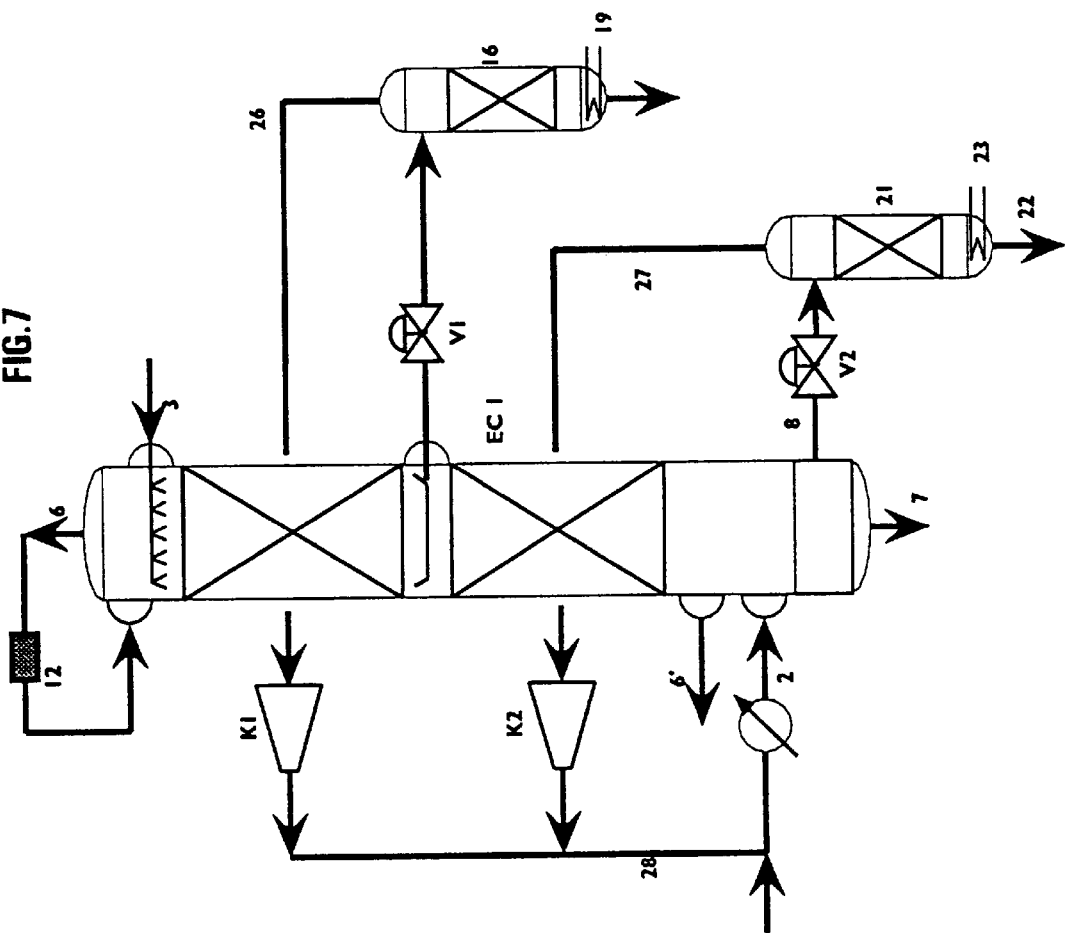

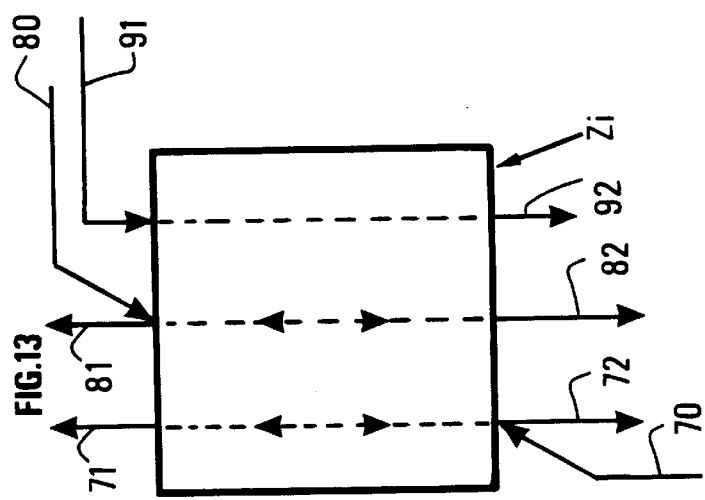
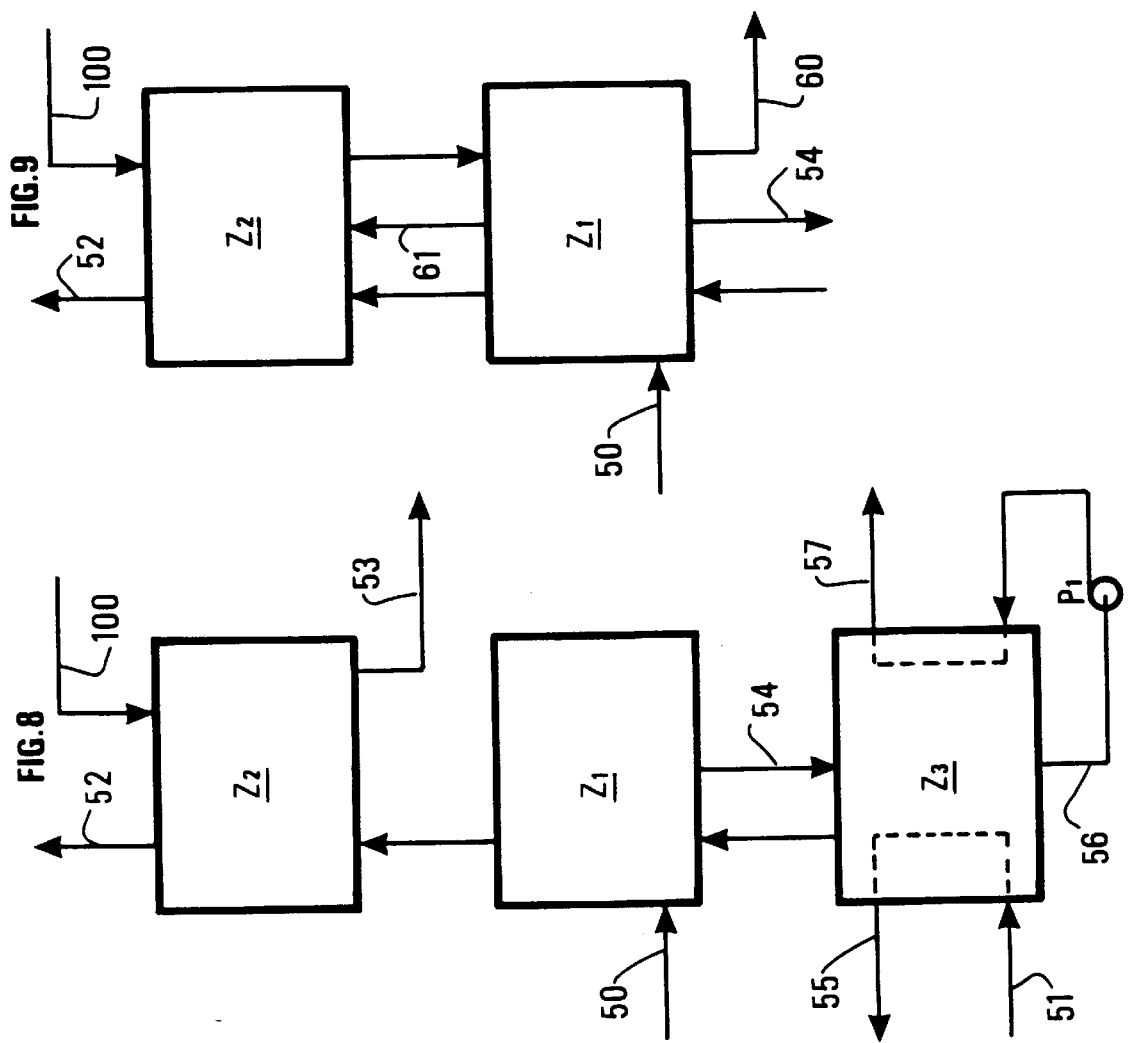

METHOD AND DEVICE FOR TREATING NATURAL GAS CONTAINING WATER AND CONDENSIBLE HYDROCARBONS

FIELD OF THE INVENTION

The present invention relates a method of treating a gas, in particular a method of dehydration, and a plant for implementing the method.

The present invention has particular advantages when applied to the dehydration of natural gas.

Advantageously, it can be used to separate condensible hydrocarbons from natural gas, for example those which have at least three carbon atoms.

BACKGROUND OF THE INVENTION

Petroleum products and natural gas in particular contain products which are undesirable for the purposes of transportation and/or handling.

Of these substances, one of the main constituents to be removed is water, which has proved to encourage the formation of hydrates and is conducive to corrosion. In practice, hydrates can cause transport pipelines to become clogged and blocked, preventing gas from passing through them in the long term, and the corrosive action of the gas causes deterioration in pipelines and processing installations. These two factors are extremely detrimental in terms of their consequences and can often lead to quite lengthy production stoppages because it is very difficult to break down any hydrates which have formed, incurring severe financial losses.

Various methods have been described in the prior art as a means of overcoming these disadvantages.

Patent FR 2.605.241 describes a method of treating natural gas spanning several stages performed in several devices in succession. In a first enclosure, the gas to be treated is brought into contact with a cooled physical solvent in order to produce a gas which is saturated with the added water from the solvent and this gas is then cooled in an exchanger in order to condense the aqueous phase containing the solvent and the saturation water as well as a phase of liquid hydrocarbons. The cooled, dehydrated gas and the fraction containing the condensed hydrocarbons are then separated in a separator unit.

This method has significant advantages as compared with the techniques used in the art. However, the methane and hydrocarbons such as propane as well as hydrocarbons with more than three carbon atoms are not fully separated.

In addition, it is necessary to use at least two devices, which requires additional space in the processing plants incurring the additional capital investment.

SUMMARY OF THE INVENTION

The present invention overcomes the disadvantages of the prior art and provides a less expensive method of treating gases, in particular natural gas, which contain water in different forms and need to be dehydrated. It can also be applied in the treatment of gas produced in industrial plants, for example refinery gases. The method and plant of the invention require only one enclosure for the dehydration process, for example an exchanger column, which means that the installation is less expensive than plants known from the prior art and requires less space.

It can be applied to advantage in the case of natural gas containing at least water, methane and condensible hydrocarbons such as the $C_{3+}$ and/or possibly the $C_{2+}$.

Throughout this description, $C_{3+}$ will be used to denote hydrocarbons containing at least three carbon atoms per molecule, $C_{4+}$ to denote all hydrocarbons having at least four carbons atoms and $C_{5+}$ all hydrocarbons having at least five carbon atoms.

The expression "treated gas" will be used to denote dehydrated gas or gas from which at least part of the saturation water has been removed.

The present invention relates to a method of treating a gas containing at least water, the purpose being to remove the water at least partially from the said gas.

It is characterised in that it consists of at least the following steps:

a) the natural gas to be treated is delivered by means of a first line and a liquid fraction containing at least an aqueous phase is delivered by means of a passage in the presence of a solvent into a contact area, for example, in order to bring the said gas and said liquid fraction into direct contact over at least a part of the contact area, the said solvent being a non-hydrocarbon substance other than water, and the said gas is at least partially cooled in the presence of the said solvent in order to condense at least a liquid phase essentially consisting of a water in mixture with the solvent, and b) the non-condensed gaseous phase is separated from the condensed liquid phase from which the solvent has been at least partially removed.

The treated gas is preferably circulated in a rising flow whilst the condensed liquid phase flows downwards.

Advantageously, the liquid phase containing the solvent is fed in from the head of the contact area of the gas and liquid fraction.

In a preferred embodiment of the method of the invention, the gas to be treated flows upwards whilst the liquid phase containing the solvent circulates in counter-flow.

The gas to be treated is cooled by producing a temperature gradient, for example, which will vary depending on the nature of the said gas and/or the said solvent.

Another embodiment uses a process of self-cooling where the gas is cooled using at least a part of the treated gas.

The quantity of solvent phase to be injected in is determined on the basis of the temperature and/or temperature gradient measured during the process, for example, and the nature of the components of the said phase in conjunction with the operating conditions, such as temperature.

The solvent may be an alcohol or a solvent selected from among the following products: dimethoxymethane, dimethoxyethane, ethanol, methoxyethanol, propanol or may possibly be selected from the different classes of solvents such as the amines or ketones, for example.

It as an advantage to use methanol as the solvent.

A gas containing at least water and constituents is other than water which are condensible at different temperatures is put through steps a) and b), whereby the gas is brought into contact with a liquid fraction containing an aqueous phase and a phase containing the said condensible constituents during step a), for example, and the said liquid fraction from which the solvent has been at least partially removed is separated into an aqueous fraction and one or more phases containing the said condensible constituents.

The method is particularly well suited to the treatment of natural gas containing at least methane, water and hydrocarbons higher than $C_2$ to $C_5$, where the treated gas, water and/or the LPG fraction and/or gasoline are separated.

The present invention also relates to a plant for treating a gas containing at least water, the purpose being to remove at least part of the water.

It is characterised in that it comprises an enclosure $EC_1$ with an delivery line for the said gas to be treated and at least one delivery line for at least one liquid phase containing at least one solvent, each of the said lines linking in to a main circuit which will allow the said gas and the said solvent phase to be brought into contact. It also has at least one discharge line for the treated gas and at least one discharge line for a liquid phase, the said discharge lines being linked to the said main contact circuit and a cooling circuit which is thermally linked to the main contact circuit. The delivery line for the liquid phase containing the solvent is located at the upper part of the disclosure.

The gas and the liquid fraction are brought into contact with one another in the presence of a solvent over at least a portion of the length of the main circuit.

In one embodiment, the plant is adapted to treat natural gas containing at least water and components which condense at different temperatures and are required to be recovered selectively.

For this purpose, the installation has at least one means for recovering the said condensed constituents and at least one outlet line communicating with the said recovery means.

The plant may have means for stabilising the said condensed constituents linked to one of the said discharge pipes for the condensed constituents and/or integrated within the enclosure, by preference in its lower part.

Advantageously, the method and plant of the invention are used to dehydrate a natural gas containing water and at least one hydrocarbon other than methane and to separate at least some of the hydrocarbons other than methane.

The plant of the invention offers the specific advantage of being compact and less expensive and optimises the process of recovering certain hydrocarbon fractions.

The implementing method reduces the cost of treating natural gas and increases output in terms of the selected hydrocarbon fractions.

Other features and advantages of the invention will become clearer from the following description giving examples of different applications involving the treatment of natural gas, which are not restrictive, and with reference to the appended drawings, in which:

BRIEF DESCRIPTION OF THE FIGURES

FIG. 7 is an example of a plant which integrates an optimised stabilisation process, FIGS. 8 and 9 illustrate variants of the method in which stabilisation occurs in a heat exchange zone, FIG. 13 illustrates an example of the technology used for the heat exchanger.

DETAILED DESCRIPTION OF THE INVENTION

The implementing method of the invention consists in simultaneously cooling a gas containing saturation water and bringing it into contact with a liquid fraction in the presence of a solvent, the purpose of which is to prevent the formation of ice and/or hydrates.

The cooling stage causes the saturation water contained in the gas as well as the liquid hydrocarbons contained in a rich natural gas to be condensed.

Advantageously, these two steps are effected in a single enclosure incorporating at least one main or contact circuit for the gas, the liquid phase and the solvent and a cooling circuit.

In the case of a rich natural gas, the plant has an advantage in that it can be used to fractionate and recover the liquid hydrocarbons for various compounds at different temperatures depending on the composition of the treated gas and the requirements of the producer.

Figure 1:
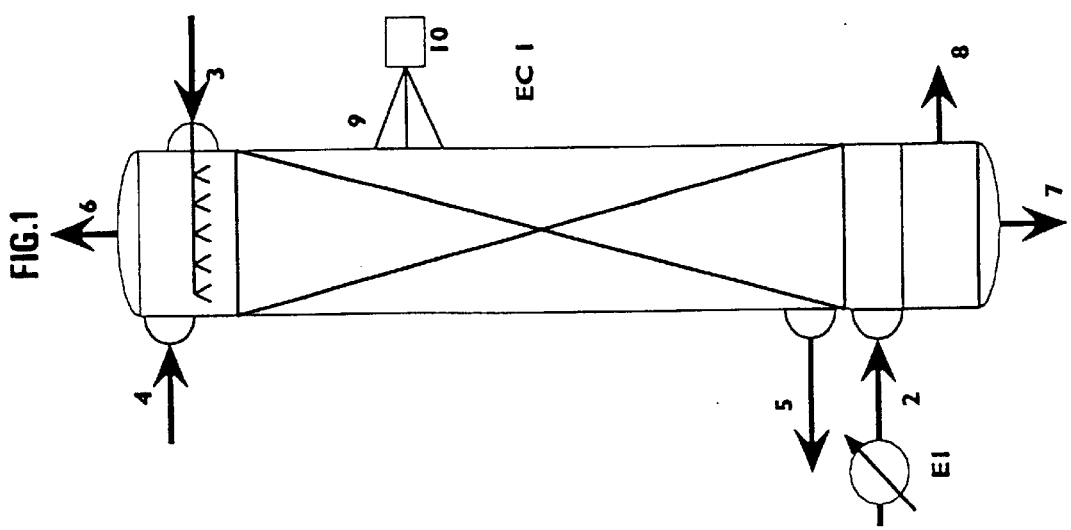
FIG. 1 is a schematic illustration of the basic principle of the invention using an external cooling circuit, FIGS. 2A and 2B describe an installation having two cooling circuits, an external circuit and a heat exchange circuit using at least some of the treated gas, as well as stabilising means.

The principle of the method is illustrated in FIG. 1 and is applied, by way of example, to a water-saturated natural gas containing the associated high hydrocarbons.

The gas to be treated is fed into an enclosure $EC_1$ such as a heat exchanger via a line 2 located in its lower part. Inside this exchanger $EC_1$, it is simultaneously brought into contact with a liquid phase made up at least partially of a solvent fed into the exchanger $EC_1$ via the line 3 and cooled by a process of indirect heat exchange, across a wall (FIGS. 8, 9), for example.

A heat-exchange medium can be used for the cooling process and will penetrate the shell of the exchanger $EC_1$ from the line 4 circulating from the top down to reduce the temperature of the gas to be treated as it rises, before being fed out of the exchanger via the line 5.

By preference, the gas to be treated is brought into contact in counter-flow and continuously with the liquid phase containing the solvent, which moves down inside the exchanger $EC_1$ as the gas to be treated moves up. The gas is preferably cooled by a continuous process of heat exchange in counter-flow.

This cooling process causes the heavy hydrocarbons contained in the gas and a part of the saturation water in the gas to condense. These two condensed liquid phases flow downwards through the device by force of gravity, in counter-flow with the treated gas, which gradually loses propane, butane and heavier hydrocarbons as a result of the exchange of matter between the gaseous phase and the liquid hydrocarbons. The condensed liquid hydrocarbon phase gradually becomes enriched with heavier constituents as it moves downward. The condensed aqueous phase rich in solvent at the head of the exchanger loses solvent as it comes into contact with the gas.

These two phases are separated by a process of decantation in the lower part of the exchanger column before being discharged respectively via passages 7 and 8.

It is also possible to discharge all of these two phases through a single passage located in the lower part of the exchanger, in the position of the line 7, for example.

The treated gas charged with solvent is discharged from the head of the exchanger column $EC_1$ through the line 6.

The gaseous phase charged with solvent and the condensed liquid phase are treated separately, for example, depending on their subsequent use or mode of transportation or to meet the specifications of the producer or consumer.

The evaporated solvent entrained with the gaseous phase will prevent the problems of hydrate formation associated with cooling.

The exchanger $EC_1$ may also be provided with means 9 to control the temperature, such as temperature sensors for example, which will be connected to control and processing means 10. The temperature sensors may be distributed along the heat exchanger $EC_1$ to measure the prevailing temperature at several points along the path of the circulating gas.

Before it is fed into the exchanger $EC_1$, the gas to be treated may be cooled using whatever coolant is available, such as water and/or air, in an exchanger $E_1$ located on the line 2. Under the temperature and pressure conditions at the outlet of the exchanger $E_1$, this first cooling step will separate a gasoline fraction made up of the condensible hydrocarbons.

A solvent is used which is at least partially miscible with water. By preference, its boiling temperature will be lower than that of water so that it can be entrained by the non-condensed gas.

This solvent may be an alcohol, for example, preferably methanol. It may also be selected from the following group of solvents: methylpropylether, ethylpropylether, dipropylether, methyltertiobutylether, dimethoxymethane, dimethoxyethane, ethanol, methoxyethanol, propanol it or may be selected from different classes of solvents such as the amines or ketones, for example, or possibly a mixture made up of one or more of these products.

The quantity of solvent to be injected is usually adjusted to suit the temperature and pressure and/or the composition of the gas in order to avoid the formation of hydrates and the formation of ice crystals due to the presence of the water.

For example, the ratio by mole of the flow rate of the solvent to the flow rate of the treated gas is within the range between $1/1000$ and $1/10$.

Advantageously, the treatment process can be optimised by adjusting the quantity of solvent injected depending on the composition of the gas, for example, and/or the operating conditions such as the temperature and/or the temperature variation and/or the pressure. To this end, account is taken of the temperature values and/or the temperature gradient measured by the temperature sensors located on a level with the exchanger.

By preference, account is also taken of any processing to which the gas will be subjected once it leaves the enclosure.

Since it circulates in counter-flow, the gas entrains with it the solvent contained in the liquid phases which move downwards by force of gravity. These liquid phases are collected at the base, the solvent having been essentially been removed from them. The solvent injected at the head is therefore mainly discharged in the gaseous phase leaving from the head. The quantity of solvent to be injected can therefore be adjusted to produce the level of concentration in this gaseous phase required to prevent hydrate formation, taking account of the temperature and pressure conditions.

The lower the temperature, the lower and weaker the solvent content in the gaseous phase will be. The quantity of solvent injected from the head of the exchanger will therefore be relatively low and constitutes a supplement intended to compensate the losses in the gas.

The solvent injected from the head does not need to be pure and may be mixed with water, for example, provided however that the concentration of solvent in aqueous phase will prevent hydrate formation.

The variation in temperature or the temperature gradient induced in the exchanger are selected on the basis of the nature of the gas and the quantity of condensed hydrocarbons, such as the LPG and gasoline, to be recovered.

Similarly, the temperature of the gas to be treated is preferably reduced in order to obtain a temperature gradient across the whole exchanger.

Advantageously, the method is partially or fully self-cooling, i.e. at least a part of the treated gas is used for the cooling process.

Figure 2B:
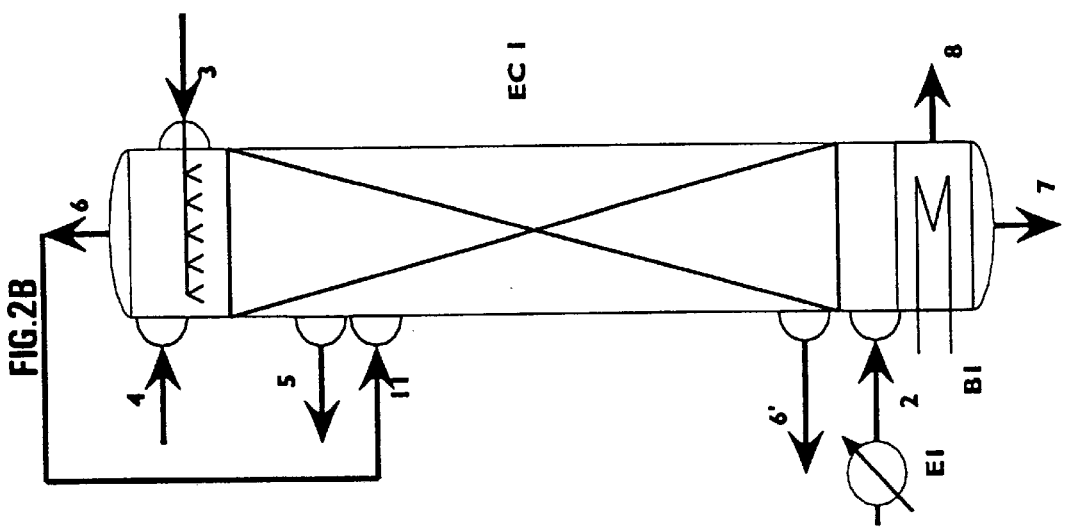
Figure 2A:
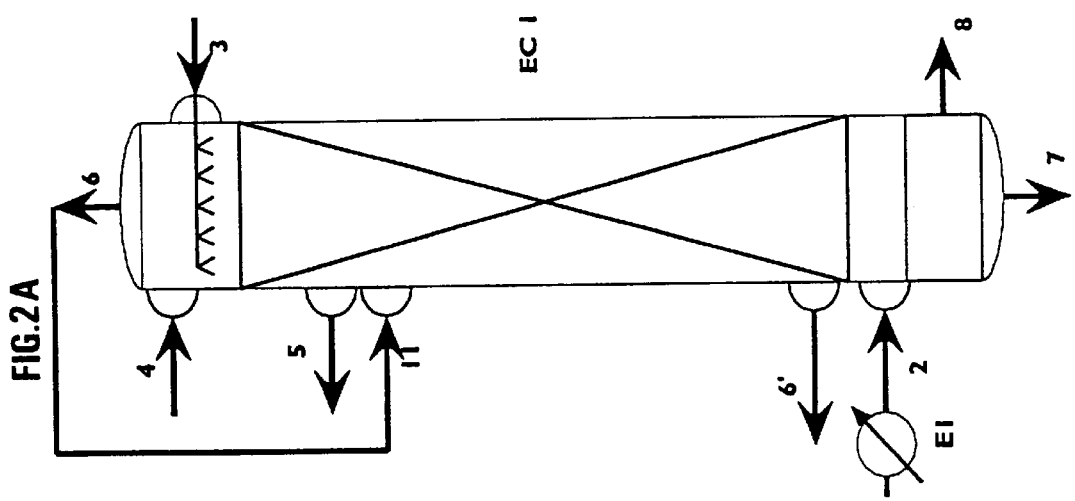

FIG. 2A illustrates an embodiment in which the heat exchanger $EC_1$ is provided with a cooling circuit which uses a heat-exchange fluid, entering via the line 4 and leaving via the line 5 illustrated in FIG. 1, lines 4 and 5 being located in the upper part, and an additional cooling circuit is provided which uses at least some of the treated gas discharged from the exchanger via the passage 6, which enters the exchanger via a line 11 preferably located below the discharge line 5 for the heat-exchange medium, and leaves via a line 6' on a level with the lower part of the exchanger.

The external heat-exchange fluid cools at least some of the treated gas in the upper part of the exchanger, which is discharged via the line 6 and fed back into the exchanger via the line 11, forming an extension to the line 6.

A liquid fraction containing the greater part of the heavier components contained in the gas fed into the heat exchanger $EC_1$ and condensed during the process is discharged via the line 8.

This liquid fraction can be stabilised by heating the volume of liquid collected at the base of the heat exchanger $EC_1$ as illustrated in FIG. 2B, where a stabilising means such as a reboiler $B_1$ is incorporated. A liquid fraction which has already been stabilised is therefore collected via the line 8 and the output of $C_1$–$C_2$ is improved, since the methane and ethane evaporated by the heating process are contained in the treated gas which is discharged through line 6'.

EXAMPLE 1

A first example of how the method of the invention is implemented is illustrated in FIG. 2A, whereby a natural gas containing the associated high hydrocarbons is treated to produce a dehydrated gas from which the constituents containing at least three carbon atoms have largely been removed.

The heat exchanger $EC_1$ is a tubular column-exchanger, for example, the tubes being lined to increase the transfer of substances between the gas, the aqueous phase, the hydrocarbon phase and the solvent.

The composition of the natural gas by mass is, for example as follows:

| | |
|---|---|
| WATER | 82.30 |
| METHANOL | 0.00 |
| NITROGEN | 211.97 |
| CARBON DIOXIDE | 397.79 |
| METHANE | 25765.00 |
| ETHANE | 6028.62 |
| PROPANE | 4360.50 |
| ISOBUTANE | 1335.05 |
| BUTANE | 487.21 |
| ISOPENTANE | 668.81 |
| PENTANE | 528.87 |
| HEXANE | 1053.47 |
| TOTAL KG/HR | 42919.59 |

The natural gas is firstly cooled in the exchanger E1, for example, to a temperature greater than or equal to its dew point close to 43° C. and a pressure essentially equal to 4.4 MPa before being delivered to the treatment device via the line 2 at a flow rate essentially equal to 42919 Kg/h. The solvent, essentially consisting of methanol, is injected via line 3 at a temperature lower than or equal to the ambient temperature and, for example, close to −20° C., at a flow rate essentially equal to 13 Kg/h.

The upper part of the exchanger $EC_1$ is cooled by a heat-exchange medium delivered via line 4 at a temperature close to −27° C. and which is discharged via line 5 at a temperature close to −23° C.

The lower part of the exchanger $EC_1$ is cooled by the treated gas discharged via line 6 and fed back into the exchanger via line 11 at a temperature essentially equal to −22° C. and at a pressure close to 4.4 MPa. The recycled treated gas lowers the temperature of the gas to be treated as it circulates in counter-flow by a process of heat exchange before it is discharged via line 6' at a temperature of 39° C.

As it cools, the natural gas to be treated gradually loses on the one hand hydrocarbons containing more than three carbon atoms which condense to form a liquid phase made up of liquid hydrocarbons, and, on the other, water, the aqueous phase formed by condensation of the saturation water being gradually discharged as it is formed.

During the dehydration process, the natural gas, the methanol and the two liquid phases are in contact. The presence of the methanol prevents the formation of ice and hydrates.

If the quantity of methanol delivered at the head is limited to the amount needed to prevent hydrate formation, the condensation water from the treated gas collected at the base of the exchanger $EC_1$ contains less than 100 ppm of solvent. This water is evacuated via the line 7 at a temperature of 43° C. at a flow rate close to 82.0 Kg/h. The liquid hydrocarbon phase enriched with $C_{3+}$ hydrocarbons and containing more than 99% $C_{5+}$ hydrocarbons, 65% of the $C_{4+}$ components and 12% of $C_{3+}$, for example, is discharged via the line 8 after being separated from the aqueous phase, by a process of decantation for example, at a flow rate of about 5175 Kg/h.

The treated gas, dehydrated and having lost some 50% of its $C_{3+}$ hydrocarbons, is discharged via the line 6 at a flow rate of 37710 Kg/h. The production yield of $C_1$ and $C_2$ is about 98% whereas the yield would be in the region of 92% if a method of the prior art were used. In another embodiment, the plant is self-cooling since it uses some of the treated gas from line 6 as the coolant.

Figure 3:
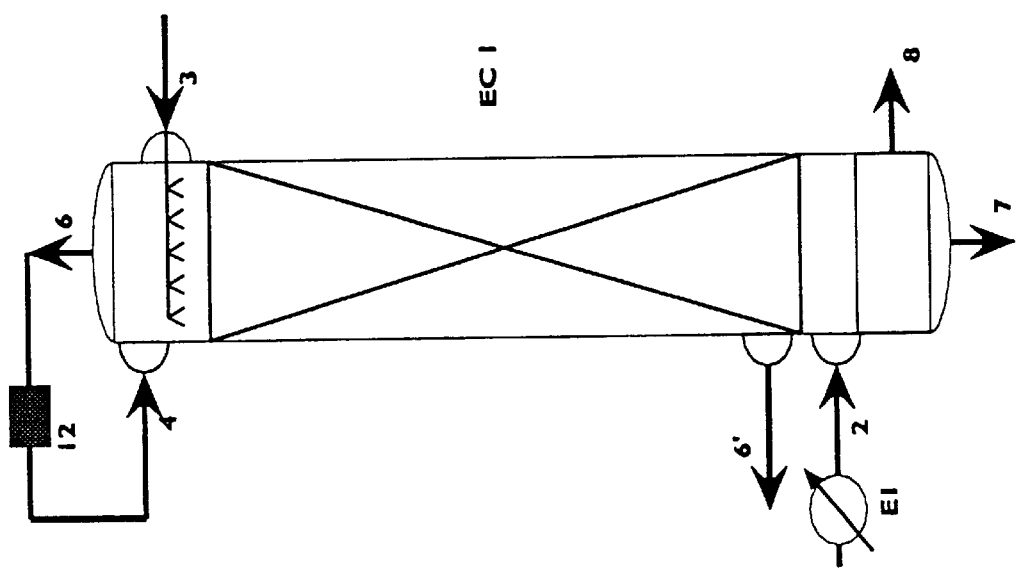
FIG. 3 shows a variant of the self-cooling system in which the treated gas is recycled and used as coolant.

An example of this type is illustrated in FIG. 3. The treated gas leaving the head of the exchanger is cooled in a device 12 located on the line 6, by being expanded through a valve, for example, or by being expanded through a turbine. Having been cooled in this way, the gas is delivered through line 4 back into the exchanger $EC_1$, where it reduces the temperature of the gas to be treated flowing upwards by a process of heat exchange. After the heat exchange, it is fed out through line 6' before being sent to another processing plant and/or a transport pipeline.

The gas discharged via line 6' may be sent to a compression device (not illustrated) downstream of the exchanger for transportation.

Advantageously, the plant can be used to recover the cuts of heavier hydrocarbons from a natural gas, depending on their composition, in particular the number of carbon atoms per molecule.

Figure 4:
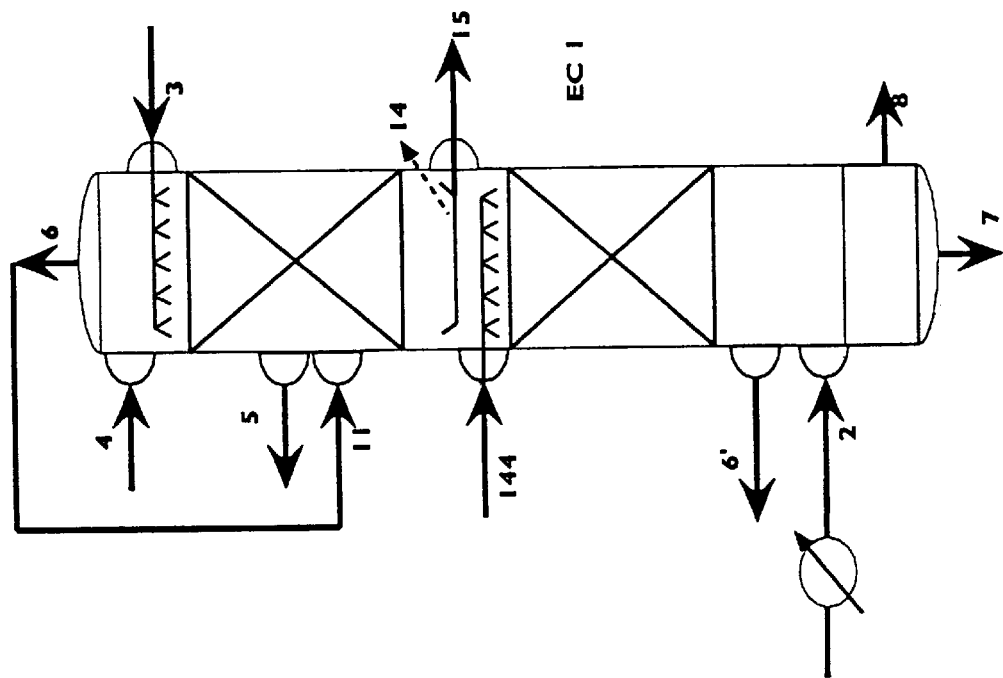
FIG. 4 illustrates a method in which an installation has means for recovering the liquid hydrocarbons from a natural gas.

FIG. 4 illustrates a treatment plant incorporating means for recovering the LPG fractions from a natural gas and separate means for recovering gasoline.

The embodiment illustrated in FIG. 4 differs from that of FIG. 2 in that it has recovery means (14, 15) arranged on a level with the exchanger. This embodiment could therefore also be incorporated with the devices illustrated in FIGS. 1 and 3 without departing from the scope of the invention.

Natural gas contains hydrocarbons which condense at different temperatures. Reducing the temperature on a given gradient inside the exchanger will allow the different hydrocarbon fractions contained in the natural gas to condense in different zones. The heavier fractions will be collected at the bottom of the exchanger and the lighter fractions at the head of the exchanger. A hydrocarbon fraction with a fixed boiling point within a certain range could also be collected from an intermediate zone.

In order to recover separately the LPG fraction, for example, which contains propane and the butanes (hydrocarbons with three or four carbon atoms) and the gasoline representing the $C_{5+}$ fraction, the exchanger $EC_1$ is fitted with a recovery means, such as a plate 14, communicating with the main zone in which the treated gas and solvent are brought into contact. The recovery plate 14 is located in a part of the exchanger, the level of which is fixed as a function of the nature of cuts or hydrocarbons to be recovered and the temperature prevailing at different points of the column.

The plate 14 will allow the condensed aqueous phase to be separated from the condensed hydrocarbons chiefly containing the propane and butanes as well as a small quantity of methane and ethane and collect them so that at least some of them can be discharged via a lateral line 15.

The separated aqueous phase as well as the hydrocarbon phase at the plate 14 which was not recovered move from the plate 14 towards the main processing circuit where they continue their downward movement before being discharged via lines 7 and 8 as described in connection with FIG. 1, for example.

Clearly, the exchanger may be fitted with several recovery plates linked to lateral discharge lines distributed along the exchanger depending on the nature of the hydrocarbons to be recovered.

In certain cases, it is an advantage to recover the solvent from a stage in which the LPG are washed externally to the exchanger by a process of liquid-liquid extraction using a "washing" and/or quantities of solvent from other devices in the processing plant.

Advantageously, the plate 14 has at least one passage 144 through which a liquid phase such as an aqueous phase containing a solvent can be delivered.

The liquid phase delivered via the line 144 may come from a washing stage of a liquid fraction drawn off, such as the liquid hydrocarbon fraction drawn off via the line 15, for example. At the level of the plate 14, this fraction of liquid hydrocarbons is in fact in equilibrium with an aqueous phase partly containing solvent and the gaseous phase which also contains solvent. As a result of this equilibrium, the liquid hydrocarbons drawn off via line 15 contain traces of solvent.

The aqueous phase from the washing stage which contains the solvent initially dissolved in the liquid hydrocarbon fraction is recycled to the exchanger column $EC_1$ via the line 144 and then brought into contact with the gas to be treated in counter-flow. During this contact process, it undergoes an exchange of matter giving off the quantity of solvent which is entrained in the gaseous phase.

The line used to re-inject the liquid phase containing the solvent to be recovered may also be located at other levels of the exchanger column. Several injection lines of this type may also be provided on the exchanger column depending on what processing is required.

Recovering this solvent and any other dissolved products will reduce operating costs.

These embodiments improve the recovery of the components of a condensate for different types of gas.

The can also be applied with gases other than natural gas, for example with refinery gases.

EXAMPLE 2

A second example of the way in which the invention is implemented is described in conjunction with FIG. 4 where the cuts of hydrocarbons contained in the natural gas can be recovered on the basis of a desired composition, for example the relevant hydrocarbons containing more than three carbon atoms.

The natural gas is cooled and fed through the contact process described in FIG. 3, for example. The other methods described in FIGS. 1 and 2 may also be applied without departing from the scope of the invention.

During the dehydration process, the natural gas loses its heavy $C_{3+}$ constituents by a process in which some of the components made up of molecules containing at least three carbon atoms condense to form a liquid hydrocarbon phase which is enriched with increasingly heavy components from the top down.

If the dimensions of an exchanger column $EC_1$ are such as to obtain the equivalent of 12 theoretical plates, the concentration of propane in the liquid hydrocarbon phase obtained at the level of the sixth plate is close to 26% by mass, for example, whereas it is 9.8% in the liquid hydrocarbon phase discharged from the base of the system via line 8. Since the concentration of propane builds up along the exchanger column, it is desirable and an advantage to draw off the hydrocarbon phases formed at the levels which will produce the required compositions.

For example, lateral branches can be used to draw off liquid hydrocarbon phases of variable composition to suit the producer's specification.

Natural gas is fed in via the line 2 at a flow rate of 42837 Kg/h, a temperature close to 43° C. and a pressure substantially equal to 4.5 MPa. Methanol is delivered via the line 3 in a quantity of 13.9 Kg/h to maintain the concentration of methanol in the aqueous phase formed in the exchanger at a gradient corresponding to a concentration which varies between 99% mass at the head of the exchanger at a temperature of −23° C. and a concentration of 0.01% by mass at the base of the exchanger at a temperature of approximately 43° C.

On a level with the recovery means 14 and 15 (FIG. 4) corresponding to the fourth theoretical plate level of the exchanger, 70% of the liquid hydrocarbon phase containing more than 25% by mass of propane is discharged via the line 15 at a temperature of about −2° C. and at a flow rate essentially equal to 3600 Kg/h.

The aqueous phase and the hydrocarbon phase containing the majority of the carbon atoms greater than $C_{4+}$ are discharged after decantation via the lines 7 and 8.

The liquid hydrocarbon phase containing the $C_{5+}$ hydrocarbons, for example, which is discharged via the line 8 at a flow rate of 2525 Kg/h, contains more than 75% of the $C_{3+}$ hydrocarbons contained in the gas to be treated.

The treated natural gas cooled by expansion through the device 12 is used in the heat exchange process to cool the natural gas to be treated circulating in counter-flow before being discharged after the exchange process via the line 6' at a flow rate of 36715 Kg/h. It has been dehydrated and more than 55% of its $C_{3+}$ hydrocarbons have been removed.

The advantage of recovering the hydrocarbons from selected zones is evident when the two examples described in relation to FIGS. 2 and 4 are compared.

A hydrocarbon phase enriched by 65% with $C_3$ and $C_4$ components is recovered on a level with the plate 14, whereas the hydrocarbon phase discharged via the line 8 is enriched by only about 20% in $C_3$ and $C_4$.

On the other hand, if cuts are recovered on lateral branches on the basis of their composition and their condensation zone, the liquid hydrocarbon phases obtained are different in composition, one rich in $C_3$ and $C_4$ components drawn off on a lateral branch and the other rich in $C_5$ and $C_6$ discharged from the base of the system.

This method will also increase the yield of $C_1$ and $C_2$ components from the treated gas.

Advantageously, the plant may also be used to stabilise the hydrocarbon fractions recovered using one of the methods described in relation to FIGS. 1 to 4.

Figure 6:
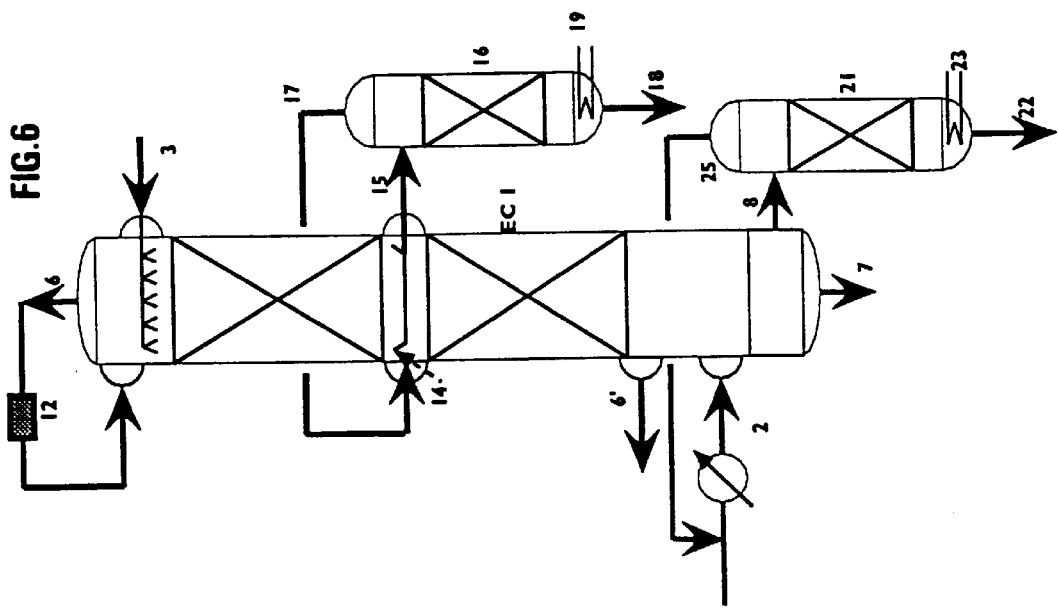
FIGS. 5 and 6 illustrate plants integrating means for drawing off different condensates linked to the stabilising means.
Figure 5:
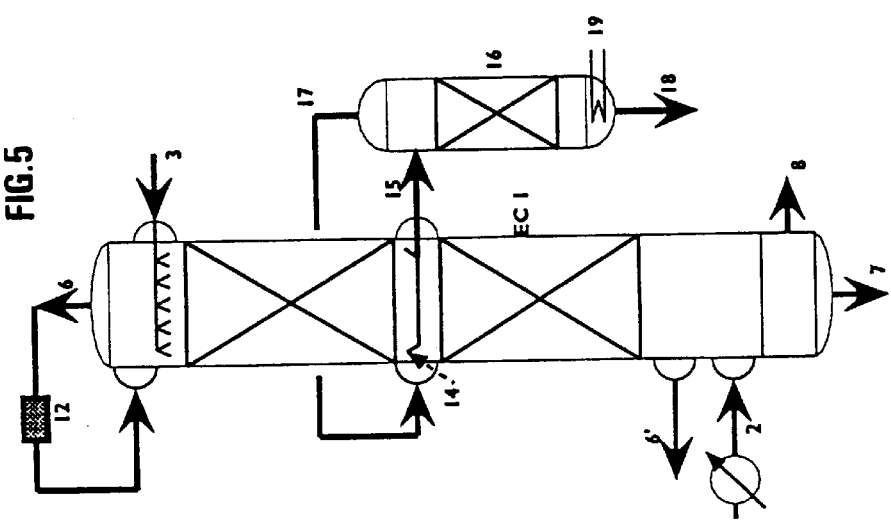

FIGS. 5 and 6 respectively illustrate plants which incorporate a dehydration device provided with means for stabilising the condensed hydrocarbons (LPG and gasoline).

In FIG. 5, the discharge line 15 communicating with the recovery plate 14 for the condensed LPG of FIG. 4 is connected to a device 16 which will allow these to be stabilised. The device used is a stabilising device known to the skilled person, for example, and will therefore not be described.

In another embodiment, the stabilising device used is an exchanger such as that previously described, whereby an exchange of heat and an exchange of matter occur simultaneously, as will be described below in relation to FIGS. 8 and 9.

The stabilisation method incorporated in the process used to recover the hydrocarbon fractions consists in feeding the condensate fraction recovered from the level of plate 14, which contains a small quantity of methane and ethane and a majority of condensed LPG, into the stabilising device 16.

The fraction rich in methane and ethane is discharged from the stabilising device via a line 17 and recycled to the exchanger $EC_1$ on a level with plate 14 to be collected and mixed with the gas to be treated.

The stabilised LPG fraction is fed out from the lower part of the stabilising device on a level with the reboiler 19 via a passage 18.

This approach has the advantage of enabling the LPG to be stabilised before they are recovered by the producer and of increasing the methane and ethane output of the method.

In FIG. 6, the plant described in FIG. 5 has a second stabilising device 21 which is used to stabilise the gasoline discharged via the line 8.

The operating diagram is identical to the one described in relation to FIG. 5 where the condensate containing mostly the gasoline and a small quantity of $C_1$ to $C_4$ hydrocarbons is discharged via the line 8 and fed to the stabilising device 21.

The stabilised gasoline is discharged through the line 22 on a level with the reboiler 23.

The gaseous fraction mainly made up of methane, ethane and propane is evacuated from the device via the line 25 to be recycled and re-mixed with the gas to be treated as it arrives via the line 2.

These two embodiments provide optimum recovery of the hydrocarbon fractions.

The stabilisation process of the LPG fractions and gasoline produced can be improved.

For this purpose, the plant described in FIG. 7 differs from that of FIG. 6 by dint of two expansion valves $V_1$ and $V_2$ located respectively on the discharge lines 14 and 8.

The gaseous fractions from the stabilising devices 16 and 21 are re-compressed in means such as compressors $K_1$ and $K_2$ before being fed back via a line 28 into the gas to be treated on a level with the passage 2.

Different technologies, known to the person skilled in the art, can be used to set up the exchange process and the relevant means or devices, some of which will be described below by way of example, are not restrictive.

FIGS. 8 and 9 illustrate variants of the embodiment of the invention in which a liquid fraction is stabilised in a contact and heat exchange zone such as the one described above.

To this end, at least one of the liquid fractions collected is fed through a contact and heat exchange zone where it is simultaneously :
- brought into contact, in counter-flow, with a rising vapour phase,
- heated by a process of indirect heat exchange in the contact and exchange zone.

In the case of two contact and heat exchange zones $Z_1$ and $Z_2$, for example, the liquid fraction from zone $Z_1$ can be stabilised in a contact and exchange zone $Z_3$ as illustrated in FIG. 8.

In this example, the gas to be treated arrives at the contact zone $Z_1$ via the line 50. A gaseous phase enriched with solvent is collected from the head of this contact and heat exchange zone $Z_1$ and fed to the contact and heat exchange zone $Z_2$ and then leaves the head of this contact zone $Z_2$ via the line 52. A relatively light liquid fraction is recovered, which is discharged through the line 53.

At the head of zone $Z_1$, a solvent is fed in via the line 100, to prevent the formation of hydrates for example, most of this solvent being evacuated with the gas leaving via the line 52.

A relatively heavy liquid fraction is collected at the base of the contact and exchange zone $Z_1$ and is fed out via the line 54.

This liquid fraction is then delivered to the contact and heat exchange zone $Z_3$, where it is simultaneously:
- brought into contact with the rising vapour phase,
- heated by a process of indirect heat exchange. This indirect exchange of heat may be between an external heating fluid arriving via the line 51 and leaving via the line 55 on the one hand and on the other the liquid fraction, which is picked up by the pump P1 as it leaves zone $Z_3$ via the line 56 and fed to zone $Z_3$, from which it is discharged cooled via the line 57. The external heating fluid may be the gas to be treated, for example, if it is hot enough, such as when it leaves a compression stage for example, or any other fluid that is available at an adequate temperature.
- after it has passed through the contact and treatment zone, the liquid fraction is discharged in a stabilised form, i.e. the lighter hydrocarbons which it contained have essentially been removed, on a level with the lower part of the exchange and reaction zone $Z_3$.

A liquid fraction from a contact and exchange zone can also be stabilised by feeding it in downward flow into a contact and heat exchange zone located below the contact and-exchange zone from which the liquid fraction has come, in counter-flow with the vapour phase generated by heating in the contact and exchange zone in which the stabilisation occurs.

In the case of two contact and exchange zones $Z_1$, $Z_2$, for example, the liquid fraction from zone $Z_1$ can be stabilised in zone $Z_2$ as illustrated in the diagram of FIG. 7.

In this example, the liquid fraction from zone $Z_2$ is fed to zone $Z_1$ where it circulates in counter-flow with the vapour phase generated by heating in this zone $Z_1$. This exchange of heat also helps to cool the gas arriving via the line 50. The stabilised liquid fraction is evacuated via the line 60. The vapour fraction from this stabilisation stage is discharged from the head of zone $Z_1$ and fed from 61 into zone $Z_2$.

The liquid fractions from one of the contact and heat exchange zones can also be stabilised in a contact and heat exchange zone operated at a higher temperature once they have been expanded to facilitate the stabilisation process.

In this case, the vapour fractions from such a stabilisation stage must be re-compressed before being fed into a higher contact and exchange zone.

The method of the invention can be used to separate, fractionate and stabilise the condensible fractions contained in a gas to be treated.

In the case of a natural gas, for example, and using three contact and heat exchange zones $Z_1$, $Z_2$ and $Z_3$ operating as illustrated in the diagram illustrated in FIG. 6, it is possible to produce a stabilised gasoline fraction with $C_{5+}$ at the base of zone $Z_3$ and a LPG fraction at the base of zone $Z_2$, which can be stabilised in zone $Z_1$ in line with the diagram illustrated in FIG. 7.

By providing a fourth exchange and contact zone $Z_1Z_2$ located above the zone $Z_1,Z_2$ and operating at a lower temperature, it is also possible to separate a $C_2$ fraction which can be stabilised by heat exchange by feeding it through zones $Z_1$ and/or $Z_2$, for example.

Figure 10:
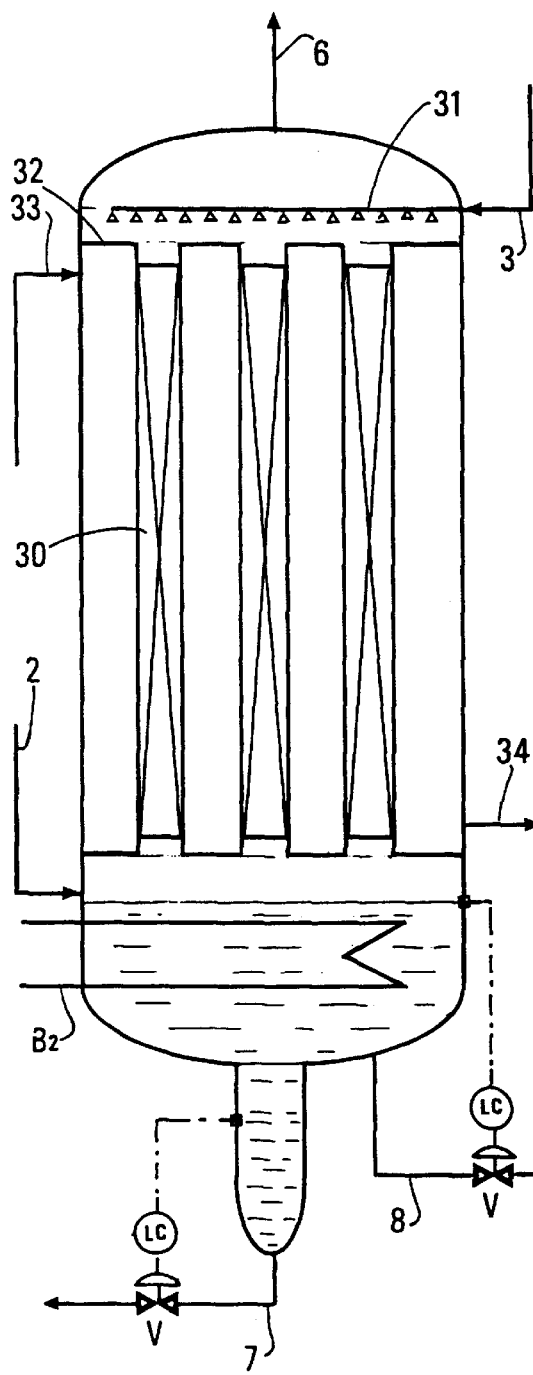
FIGS. 10, 11 and 12 are examples of the technology used to make the heat exchanger.

The exchanger $EC_1$ is a shell and tube heat-exchanger, for example, such as that illustrated in FIG. 10.

The gas to be treated arrives via the line 2 and flows upwards inside the vertical tubes 30. These tubes are preferably provided with a lining, such as a structured lining, so as to improve the contact between the rising gas and the liquid fractions flowing downwards. The treated gas is discharged from the head via the line 6. The solvent is fed in from the line 3 and directed into the different tubes 30 by means of a feeder ramp 31 towards a distribution plate 32.

The liquid hydrocarbon phase, stabilised through heat by means of a reboiler $B_2$ located in the lower part of the exchanger $EC_1$, for example, is evacuated at a controlled level via the line 8 and the aqueous phase is discharged at a controlled level via the line 7.

A heat exchange medium is used for cooling and is fed into the exchanger via the line 33 and discharged after the heat exchange via the line 34.

Figure 11:
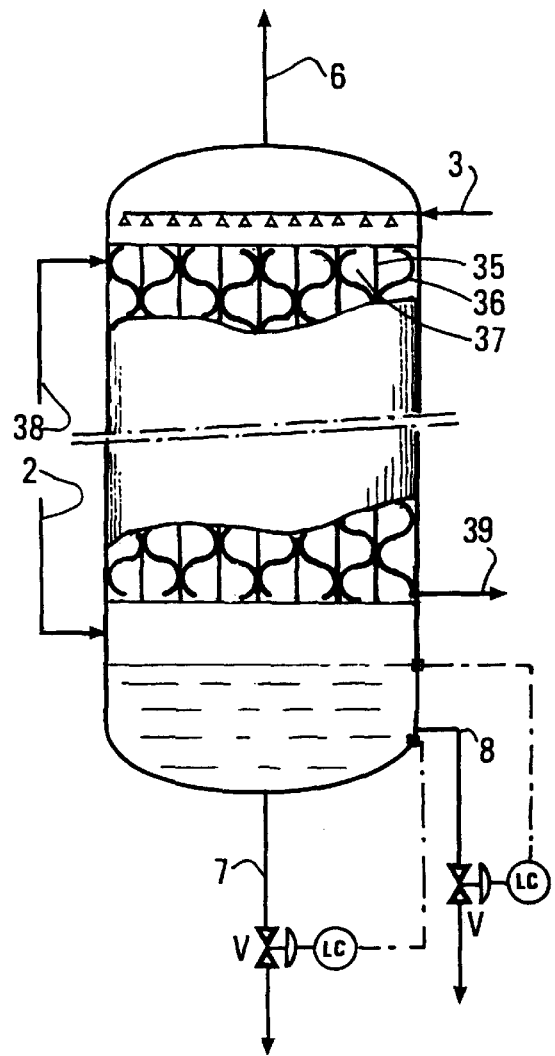

Using a different technology, the heat exchanger $EC_1$ could be a plate exchanger, made from brazed aluminium for example, such as that illustrated in FIG. 11.

A heat exchanger of this type consists of an assembly of flat plates 35 between which corrugated plates 36 are inserted in order to maintain mechanical strength and improve the transfer of heat.

These plates define channels 37 through which the fluids taking part in the heat exchange process flow.

The gas to be treated and fed into the exchanger via the line 2 circulates through the channels 37 in an upward direction and is gradually cooled by the heat exchange medium. The interleaved corrugated plates 36 fulfilling the role of a structured lining promote the contact between the rising gas and the liquid fractions moving downwards. The solvent fed in via the line 3 is evenly distributed cross the top of the channels 37 in which the gas to be treated is flowing.

If a self-cooling process is used, the dehydrated gas is discharged from the head of the exchanger via the line 6, cooled by expansion using a method such as that described in relation to FIG. 3, for example, and fed back into the upper part of the exchanger by means of the passage 38 which provides a discharge essentially perpendicular to the plane of the section illustrated in FIG. 11 and links up with feeder area for the channels which is not illustrated in the drawing. It is then evacuated after thermal exchange by means of conduct 39, perpendicular to the plane of the section illustrated in FIG. 11. The delivery and discharge means are devices well known to the skilled person and provide a passage for the fluids flowing from each of channels into the discharge pipe and conversely distribute the fluid from one passage into the different channels.

The liquid hydrocarbon phase, which may have been stabilised by the reboiler $B_3$, is discharged at a controlled level via the line 7.

Other types of plate exchangers may also be used, such as exchangers with stainless steel plates welded to one another, either edge to edge or across their entire surface, using a diffusion welding technique, for example.

The plates are made by a blasting process, for example, or by chemical engraving.

Clearly, the skilled person could use any of the known and available techniques to improve the contact between the phases and/or the fluid distribution without departing from the scope of the invention.

Figure 12:
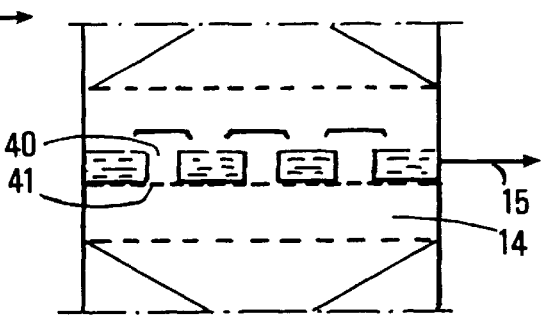

FIG. 12 illustrates an embodiment of a plate which allows phases to be drawn off depending on their nature, using a process such as that described in relation to FIG. 4, for example.

The plate has ducts 40 which allow the gas to rise towards the upper part of the exchanger. The liquid phase which is collected on this plate can be discharged via the passage 15 at a controlled flow rate but may also be allowed to overflow down to the lower part of the exchanger. It is therefore possible to set the system up so that only a fraction of the liquid phase arriving from the upper part of the exchanger is collected.

If two liquid phases are drawn off from the plate, a liquid hydrocarbon phase and an aqueous phase for example, they can be discharged separately at least to a certain extent. The aqueous phase, which is the heaviest, tends to collect at the base of the plate and it is possible to discharge it through perforations 41, for example, provided in the plate.

Another method of discharge known to the skilled person could be used for one or the other of the phases without departing from the scope of the invention.

Generally speaking, any heat exchange technology can be used provided that it allows:

the process of heat exchange to be effected in counter-flow, separate circulation of several fluids which can then be delivered and discharged separately.

A contact and exchange zone Zi must be capable of operating as illustrated in the diagram of FIG. 13, providing a passage simultaneously for:

one or more gaseous fractions arriving via the line 70, a liquid phase generated by cooling in the zone Zi circulating in counter-flow, producing a gaseous fraction which is discharged from the head of the zone Zi via the passage 71 and a liquid fraction which is discharged from the base of zone Zi via the passage 72, one or more liquid fractions arriving via the passage 80 which may contain a solvent, a vapour phase generated by heating in the zone Zi circulating in counter-flow, producing a gaseous fraction which is discharged from the head of zone Zi via the passage 81 and a liquid fraction which is discharged from the base of zone Zi via the passage 82, one or more fluids participating in the cooling or heating process in zone Zi, whereby a coolant, for example, can be delivered via the passage 91 at the head of zone Zi and discharged via the passage 92 at the base of zone Zi.

We claim:

1. A method of treating natural gas containing at least water in order to remove at least part of the water from said gas, characterized in that it comprises at least the following steps:

a) feeding the natural gas to be treated by means of a first line and feeding a liquid fraction containing at least an aqueous phase via a second line, in the presence of a solvent, into a contact zone so as to bring said gas into direct contact with said liquid fraction over at least a portion of the contact zone, said solvent being a non-hydrocarbon compound other than water, and simultaneously at least some of said gas is cooled in the presence of said solvent in order to condense at least one liquid phase essentially consisting of water in a mixture with said solvent, so as to produce at least a solvent-containing phase, an aqueous phase and different condensible components initially present in the gas to be treated, and b) separating non-condensed gaseous phase condensed liquid phase, and one or more condensible components.

2. A method as claimed in claim 1, characterized in that the said liquid phase containing the solvent is delivered to the upper part of the zone in which the gas and liquid fraction are in contact.

3. A method as claimed in claim 1, characterized in that the method used to bring the solvent phase and the gas to be treated in contact is a system of counter-flow between the rising gas and downwardly moving liquid phase.

4. A method as claimed in claim 1, characterized in that at least some of the gas to be treated is cooled by producing a temperature gradient which varies as a function of the nature of at least one of said gas or the nature of said solvent.

5. A method as claimed in claim 1, characterized in that the cooling process is effected using at least some of the treated gas.

6. A method as claimed in claim 1, characterized in that at least one of temperature or temperature gradient is determined during processing and the quantity of solvent phase to be injected is determined on the basis of the nature of the composition of said solvent phase and the operating conditions.

7. A method as claimed in claim 1, characterized in that the solvent is selected from the group consisting of methylpropylether, ethylpropylether, dipropylether, methyltertiobutylether, dimethoxymethane, dimethoxyethane, ethanol, methoxyethanol, and propanol.

8. A method as claimed in claim 1, characterized in that the solvent is methanol.

9. A method as claimed in claim 1, characterized in that steps a) and b) are carried out on a gas containing at least water and constituents other than water which are condensible at different temperatures, by placing the gas in contact with an aqueous phase containing a liquid phase during step (a) and said liquid phase from which at least some of the solvent has been essentially removed is separated into an aqueous phase and one or more phases containing said condensible constituents.

10. A method as claimed in claim 9, characterized in that a natural gas containing at least methane, water and high hydrocarbons from $C_2$ to $C_5$ (LPG fraction) is treated, and the treated gas and at least one of the water the LPG fraction or gasoline are separated.

11. A plant for treating a gas containing at least water in order to remove at least some of the water from the gas to be treated, characterized in that it comprises an enclosure provided with a cooling circuit, a delivery line for said gas to be treated and a delivery line for at least one liquid phase containing at least one solvent, each of the said delivery lines being linked to a main circuit allowing said gas and said solvent phase to be brought into contact, at least one discharge line for treated gas and at least one discharge line for a liquid phase, at least means for recovering separated components inside the plant and discharge lines for discharging the separated components, said discharge lines being connected to said main contact circuit and said cooling circuit which communicates thermally with said main contact circuit.

12. A plant as claimed in claim 11, characterized in that the said delivery line for the said liquid phase containing the solvent is located at the upper part of the enclosure.

13. A plant for treating a gas containing at least water and constituents which are condensible at different temperatures as claimed in claim 12, characterized in that it has at least one means for recovering the said condensed constituents and at least one discharge line communicating with the said recovery means.

14. A plant as claimed in claim 1, characterized in that it has at least one means for stabilizing the said condensed constituents linked to one of the said discharge lines for the condensed constituents.

15. A process of dehydrating a natural gas containing water and at least one hydrocarbon other than methane and separating at least some of the at least one hydrocarbon other than methane, characterized in that it comprises at least the following steps:

a) feeding the gas to be treated by means of a first line and feeding a liquid fraction containing at least an aqueous phase via a second line, in the presence of a solvent, into a contact zone so as to bring said gas into direct contact with said liquid fraction over at least a portion of the contact zone, said solvent being a non-hydrocarbon compound other than water, and at least some of said gas is cooled in the presence of the solvent in order to condense at least one liquid phase essentially consisting of water in a mixture with the solvent, and b) separating non-condensed gaseous chase from condensed liquid phase from which the solvent has essentially been removed.

16. A method as claimed in claim 1, characterized in that the solvent is selected from the group consisting of alcohols, amines and ketones.

17. A plant according to claim 11, wherein said plant further comprises an exchanger for cooling the gas to be treated prior to feeding said gas to be treated into the enclosure, and wherein exchanger cools with at least one of water or air.

18. A plant for treating a gas containing at least water in order to remove at least some of the water from said gas, comprising an enclosure including (a) a delivery line for said gas to be treated and a delivery line for at least one liquid phase containing at least one solvent, each of said delivery lines being linked to a main circuit allowing said gas and said solvent phase to be brought into contact, (b) a cooling circuit which communicates thermally with said main contact circuit, (c) at least one discharge line for treated gas and at least one discharge line for a liquid phase, (d) at least means for recovering separated components inside the plant and lines for discharging the separated components, wherein said means for recovering separated components allow for selective recovery of condensible components, and (e) said discharge lines being connected to said main contact circuit and a cooling circuit which communicates thermally with said main contact circuit.

19. A plant for treating a gas as in claim 18, wherein said means for recovering separated components allowing for selective recovery of condensible components comprise at least one recovery plate for condensed components and discharge lines in communication said recovery plates.

20. A plant according to claim 11, wherein said enclosure further comprises a temperature controller.

* * * * *